United States Patent
Burnside et al.

(10) Patent No.: US 9,953,408 B2
(45) Date of Patent: Apr. 24, 2018

(54) METHODS FOR MONITORING COMPONENTS

(71) Applicant: General Electric Company, Schenectady, NY (US)

(72) Inventors: Jason Lee Burnside, Greenville, SC (US); Gregory Lee Hovis, Martinez, GA (US); William F. Ranson, Columbia, SC (US); Robert William Davidoff, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/942,159

(22) Filed: Nov. 16, 2015

(65) Prior Publication Data

US 2017/0140519 A1 May 18, 2017

(51) Int. Cl.
| | | |
|---|---|---|
| G06K 9/00 | (2006.01) |
| G06K 9/32 | (2006.01) |
| G06T 7/00 | (2017.01) |
| F01D 5/02 | (2006.01) |
| F01D 5/12 | (2006.01) |
| F01D 9/02 | (2006.01) |
| F01D 21/00 | (2006.01) |

(Continued)

(52) U.S. Cl.
CPC ............ *G06T 7/0004* (2013.01); *F01D 5/02* (2013.01); *F01D 5/12* (2013.01); *F01D 9/02* (2013.01); *F01D 17/04* (2013.01); *F01D 21/003* (2013.01); *F01D 25/24* (2013.01); *F04D 27/001* (2013.01); *F04D 29/324* (2013.01); *F04D 29/522* (2013.01); *F04D 29/542* (2013.01); *G01B 11/165* (2013.01); *G01M 5/0016* (2013.01); *G01M 5/0091* (2013.01); *G06K 9/46* (2013.01); *G06K 9/6202* (2013.01); *G06K 9/6215* (2013.01); *F05D 2220/31* (2013.01); *F05D 2220/32* (2013.01); *F05D 2270/332* (2013.01); *F05D 2270/80* (2013.01); *F05D 2270/808* (2013.01); *F05D 2270/821* (2013.01); *G06T 2207/30164* (2013.01)

(58) Field of Classification Search
CPC ........ G06T 7/0004; G06T 2207/30164; G06K 9/6202; G06K 9/6215; G06K 9/46; F01D 5/02; F01D 5/12; F01D 9/02; F01D 25/24; F01D 21/003; F04D 29/522; F04D 29/542; F04D 27/001; F04D 29/324; F05D 2220/32; F05D 2220/31
USPC ................ 382/100, 103, 152, 276, 286, 288
See application file for complete search history.

(56) References Cited

U.S. PATENT DOCUMENTS

| 4,528,856 A | 7/1985 | Junker et al. |
| 4,746,858 A | 5/1988 | Metala et al. |

(Continued)

FOREIGN PATENT DOCUMENTS

WO    WO 2014/031957    2/2014

*Primary Examiner* — Sheela C Chawan
(74) *Attorney, Agent, or Firm* — Dority & Manning, P.A.

(57) ABSTRACT

Methods for monitoring components are provided. A component has an exterior surface. A method includes locating a centroid of a reference feature configured on the component, and measuring a first value of a characteristic of the reference feature relative to the centroid at a first time. The method further includes measuring a second value of the characteristic relative to the centroid at a second time after the first time, and comparing the first value and the second value.

18 Claims, 7 Drawing Sheets

(51) Int. Cl.
*F01D 25/24* (2006.01)
*F04D 27/00* (2006.01)
*F04D 29/32* (2006.01)
*F04D 29/52* (2006.01)
*F04D 29/54* (2006.01)
*G06K 9/46* (2006.01)
*G06K 9/62* (2006.01)
*F01D 17/04* (2006.01)
*G01M 5/00* (2006.01)
*G01B 11/16* (2006.01)

(56) References Cited

U.S. PATENT DOCUMENTS

| | | | |
|---|---|---|---|
| 4,782,705 A | 11/1988 | Hoffmann et al. | |
| 4,859,062 A | 8/1989 | Thurn et al. | |
| 6,078,396 A | 6/2000 | Manzouri | |
| 6,175,644 B1 | 1/2001 | Scola et al. | |
| 6,574,363 B1 | 6/2003 | Classen et al. | |
| 6,983,659 B2 * | 1/2006 | Soechting | F01D 21/003 73/802 |
| 6,986,287 B1 | 1/2006 | Dorfman | |
| 7,200,259 B1 | 4/2007 | Gold et al. | |
| 7,227,648 B2 | 6/2007 | Weinhold | |
| 7,414,732 B2 | 8/2008 | Maidhof et al. | |
| 7,421,370 B2 | 9/2008 | Jain et al. | |
| 7,441,464 B2 | 10/2008 | Turnbull et al. | |
| 7,477,995 B2 | 1/2009 | Hovis et al. | |
| 7,490,522 B2 | 2/2009 | Ruehrig et al. | |
| 7,533,818 B2 | 5/2009 | Hovis | |
| 7,689,003 B2 | 3/2010 | Shannon et al. | |
| 7,697,966 B2 | 4/2010 | Monfre et al. | |
| 7,849,752 B2 | 12/2010 | Gregory et al. | |
| 8,098,247 B2 | 1/2012 | Crucs | |
| 8,244,025 B2 * | 8/2012 | Davis | G06T 19/00 345/419 |
| 8,245,578 B2 | 8/2012 | Ranson et al. | |
| 8,307,715 B2 | 11/2012 | Ranson | |
| 8,511,182 B2 | 8/2013 | Bjerge et al. | |
| 8,600,147 B2 | 12/2013 | Iliopoulos et al. | |
| 8,687,206 B2 * | 4/2014 | Hockaday | G01B 11/026 356/614 |
| 8,818,078 B2 * | 8/2014 | Telfer | F03D 17/00 382/149 |
| 8,994,845 B2 | 3/2015 | Mankowski | |
| 9,128,063 B2 | 9/2015 | Dooley | |
| 9,200,889 B2 | 12/2015 | Swiergiel et al. | |
| 9,207,154 B2 | 12/2015 | Harding et al. | |
| 9,311,566 B2 | 4/2016 | Iliopoulos et al. | |
| 9,316,571 B2 | 4/2016 | Müller et al. | |
| 2012/0143525 A1 * | 6/2012 | Chen | G01M 5/0025 702/42 |
| 2013/0013224 A1 * | 1/2013 | Ito | G01B 11/16 702/42 |
| 2013/0194567 A1 | 8/2013 | Wan et al. | |
| 2013/0202182 A1 | 8/2013 | Rowe | |
| 2013/0202192 A1 | 8/2013 | Telfer et al. | |
| 2014/0000380 A1 | 1/2014 | Slowik et al. | |
| 2014/0267677 A1 | 9/2014 | Ward, Jr. et al. | |
| 2015/0239043 A1 | 8/2015 | Shipper, Jr. et al. | |
| 2016/0161242 A1 * | 6/2016 | Cook | G06K 19/07749 73/779 |
| 2016/0313114 A1 | 10/2016 | Tohme et al. | |
| 2016/0354174 A1 | 12/2016 | Demir | |

* cited by examiner

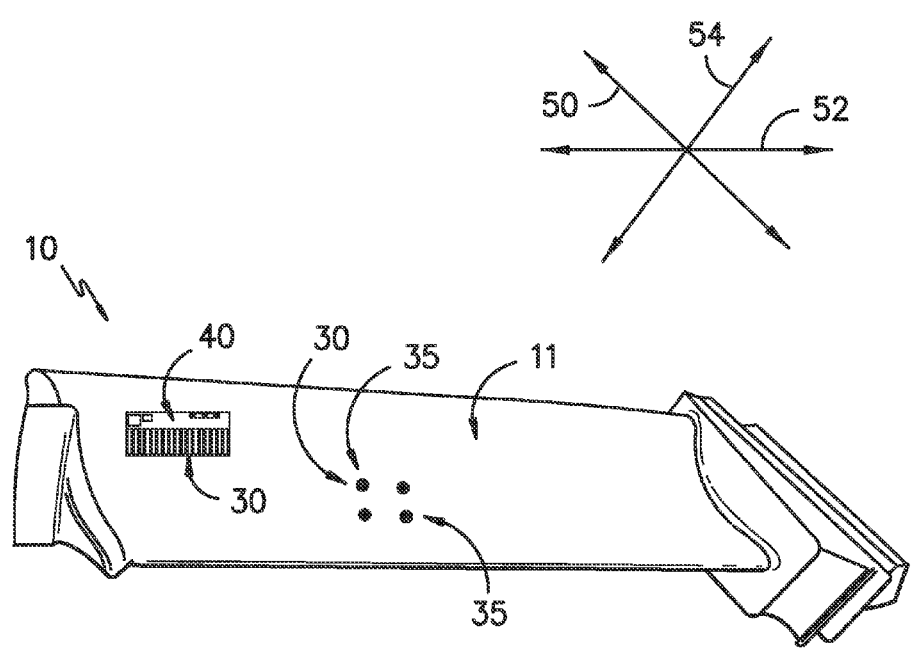
FIG. -1-

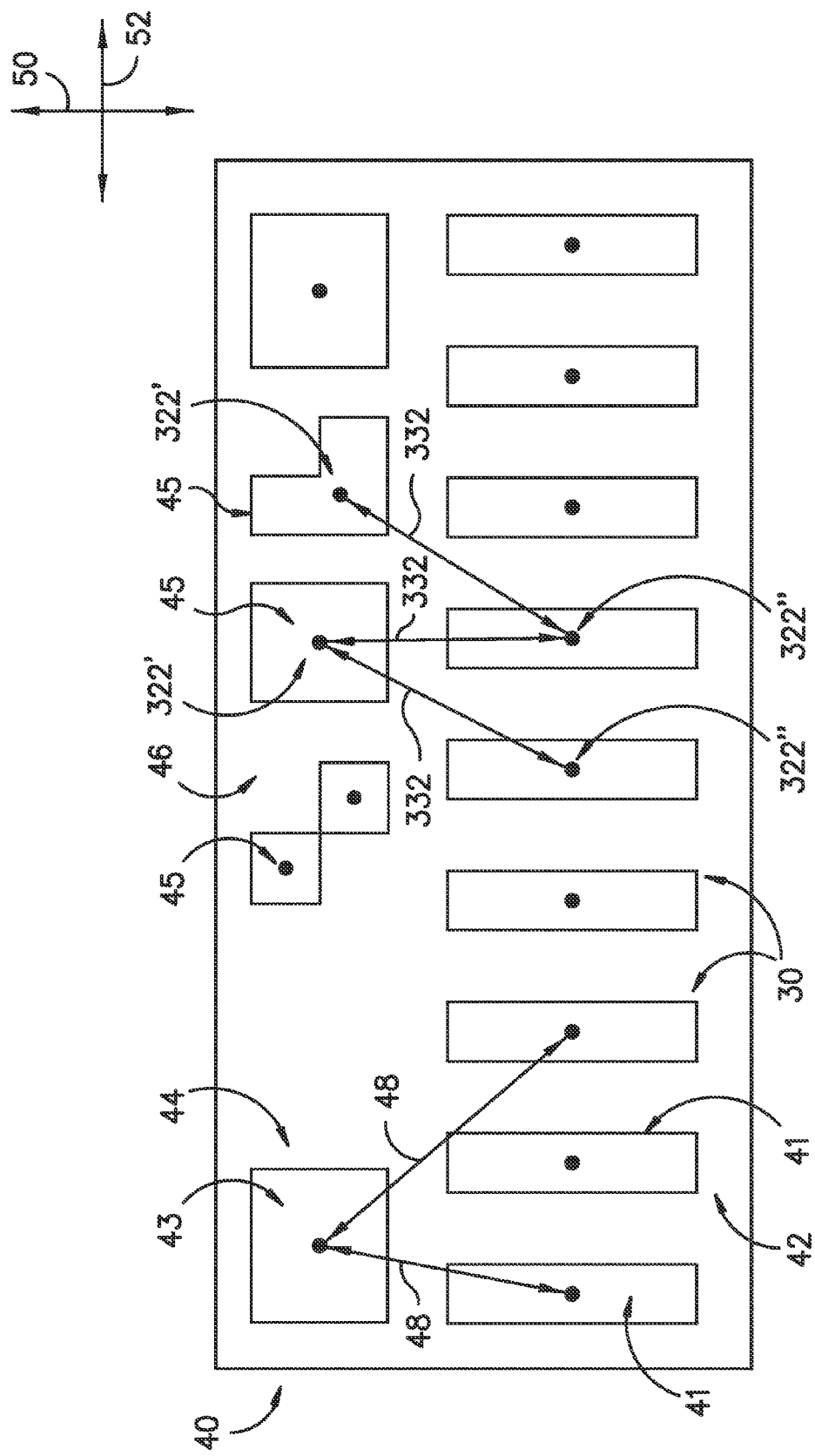
FIG. -2-

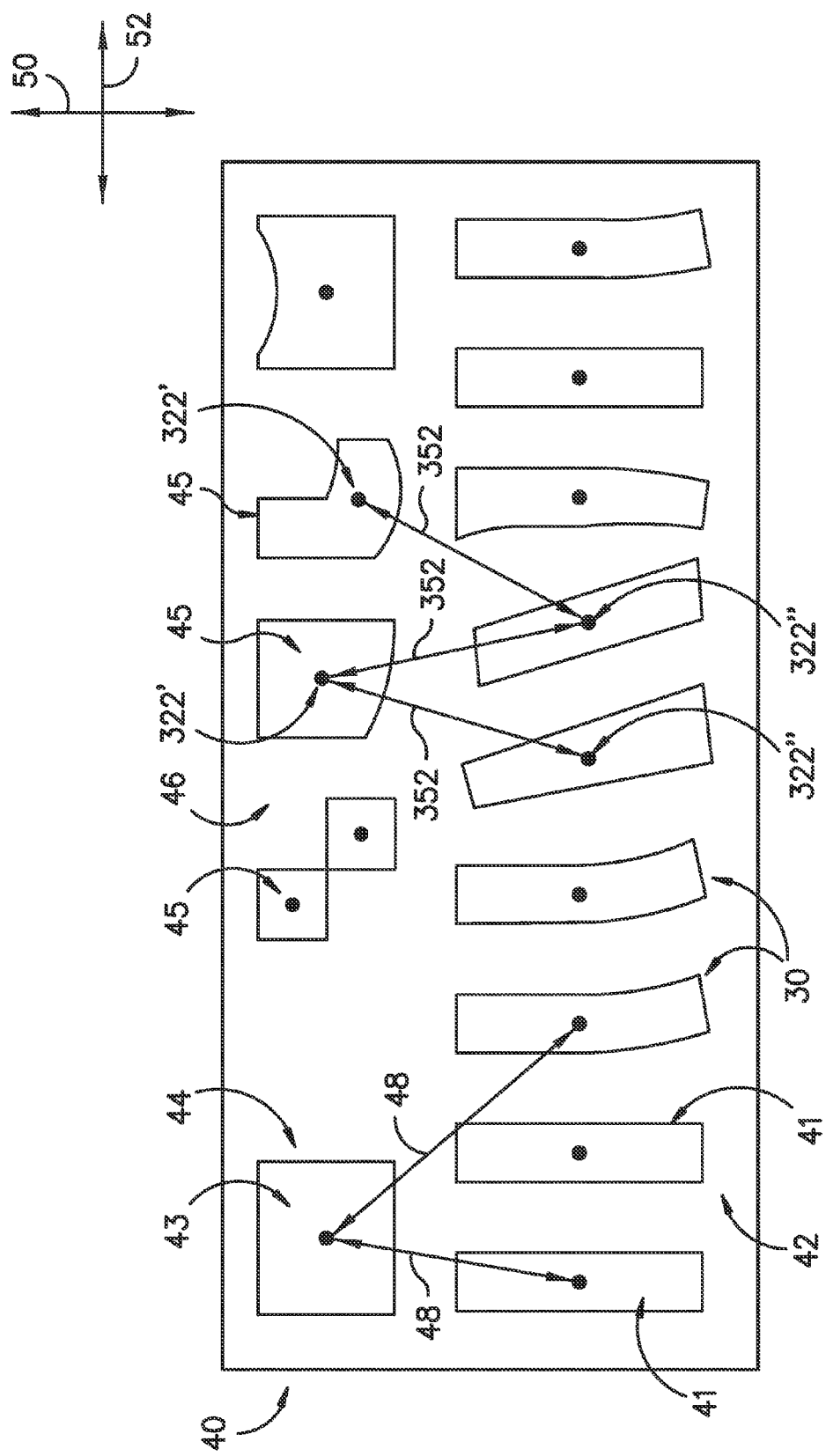
FIG. -3-

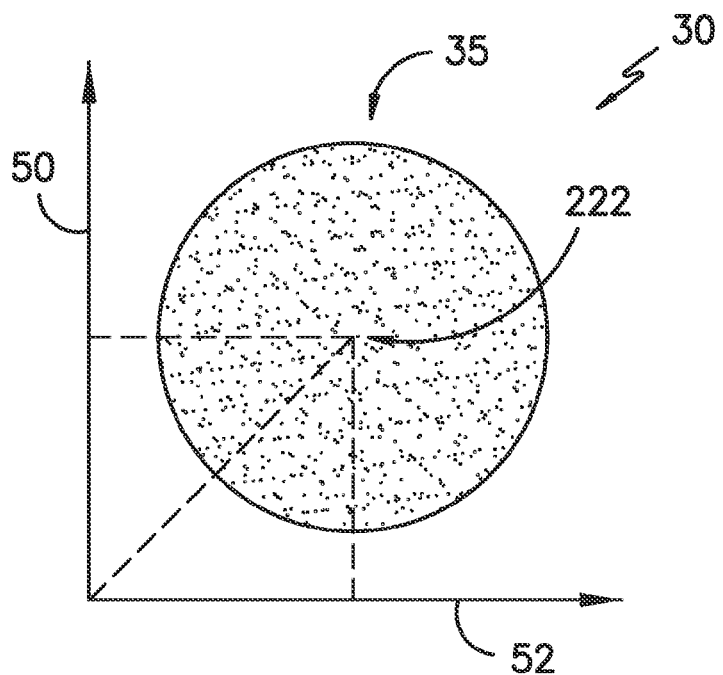
FIG. -4-
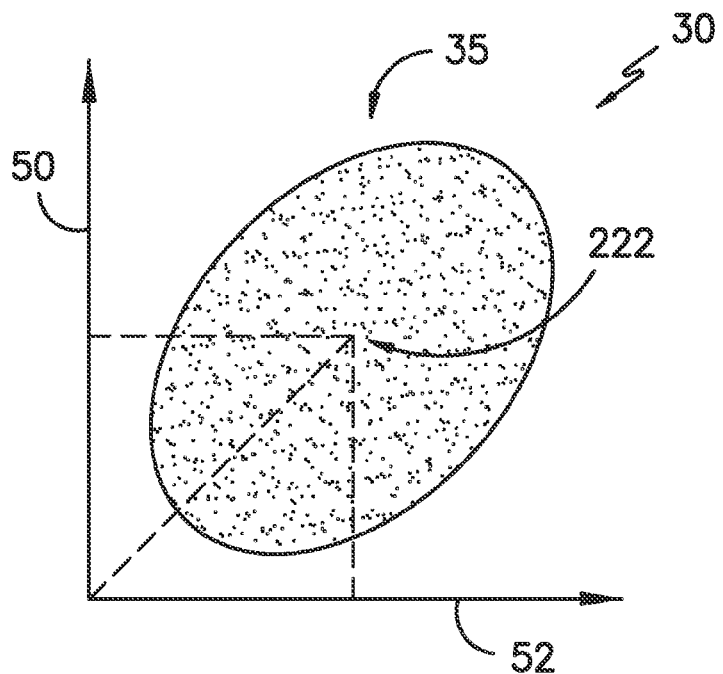
FIG. -5-

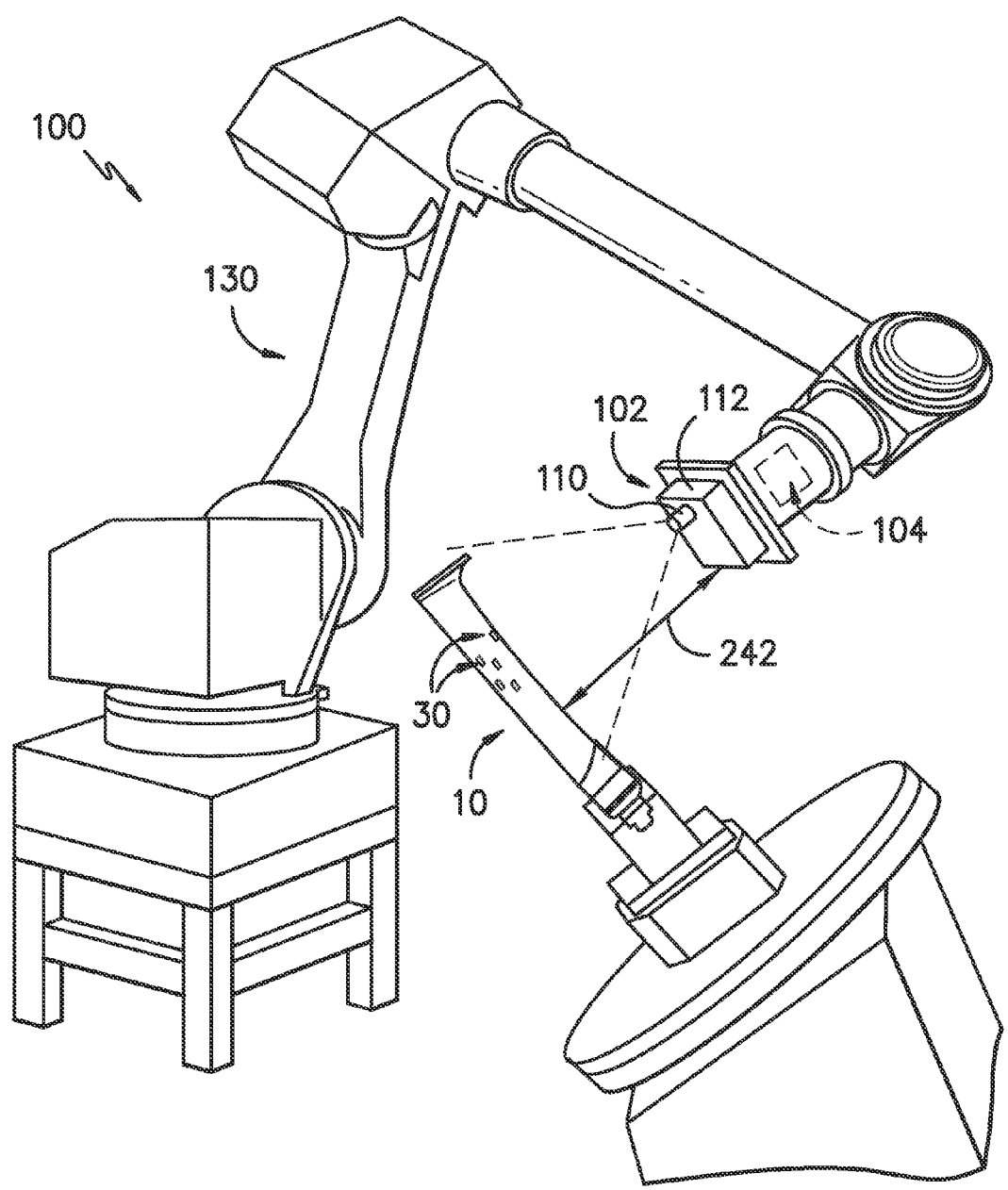
FIG. -6-

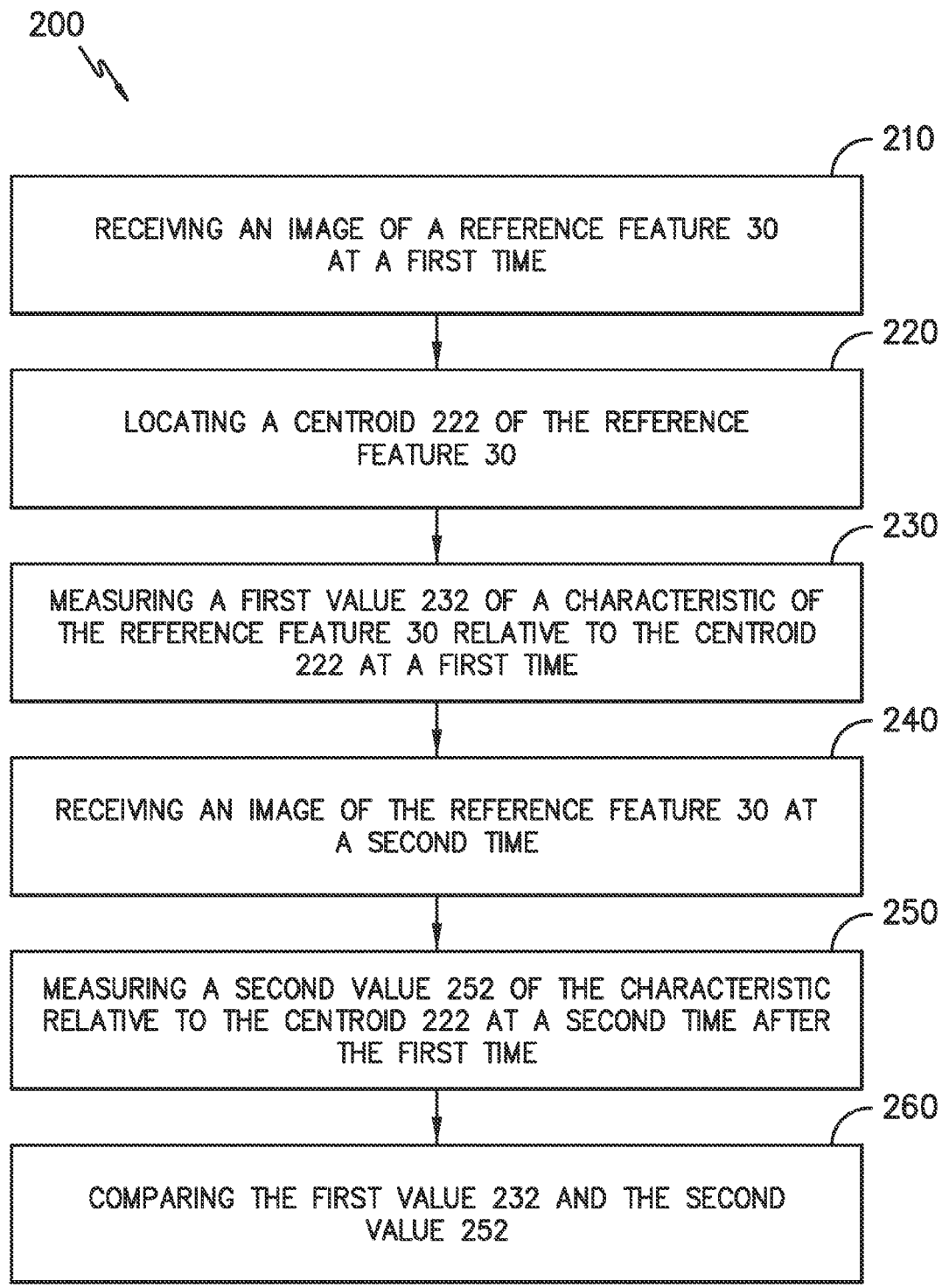
FIG. -7-

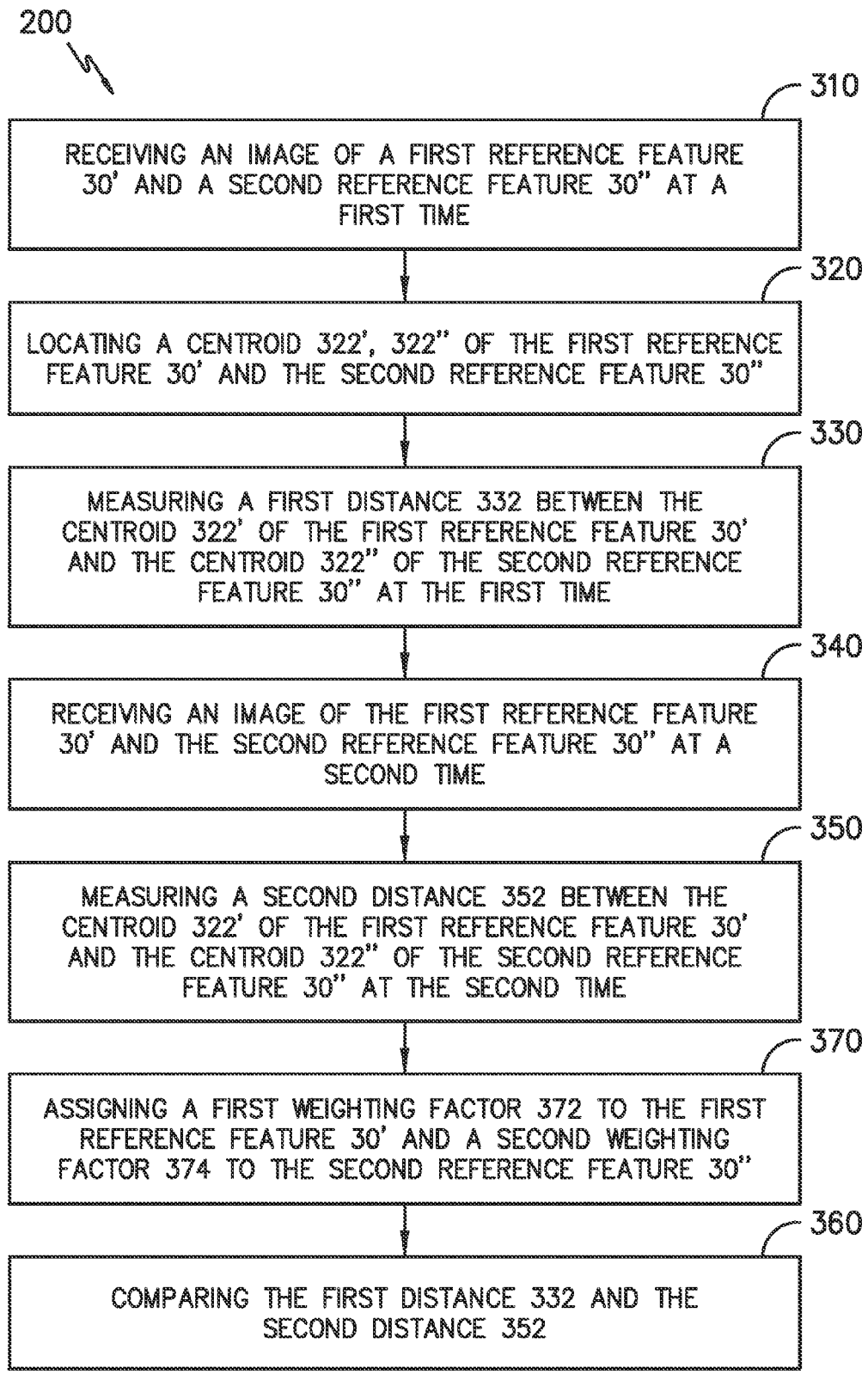
FIG. -8-

1
METHODS FOR MONITORING COMPONENTS

FIELD OF THE INVENTION

The present disclosure relates generally to methods for monitoring components, and more particularly to methods which provide alternative data collection approaches for deformation analysis.

BACKGROUND OF THE INVENTION

Throughout various industrial applications, apparatus components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of a turbomachine, various components (collectively known as turbine components) within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, components, such as turbine components, may be monitored for creep. One approach to monitoring components for creep is to configure strain sensors on the components, and analyze the strain sensors at various intervals to monitor for deformations associated with creep strain.

Known strain sensors typically include a locator element and various analysis elements, and measurements of the analysis elements relative to the locator element are taken at different times and analyzed to monitor for deformation. However, one concern is that the locator element could become damaged or lost during operation of the component, thus rendering subsequent analysis impossible. Another concern is that the strain sensor is required to have multiple elements, such as the locator element and a variety of analysis elements, to facilitate deformation monitoring. Damage to any one element can render the strain sensor not usable.

Accordingly, alternative methods for monitoring components are desired in the art. In particular, methods which provide alternative approaches to the collection of data for deformation analysis would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for monitoring a component is disclosed. The component has an exterior surface. The method includes locating a centroid of a reference feature configured on the component, and measuring a first value of a characteristic of the reference feature relative to the centroid at a first time. The method further includes measuring a second value of the characteristic relative to the centroid at a second time after the first time, and comparing the first value and the second value.

In accordance with another embodiment of the present disclosure, a method for monitoring a component is disclosed. The component has an exterior surface. The method includes locating a centroid of a first reference feature and a second reference feature configured on the component, and measuring a first distance between the centroid of the first reference feature and the centroid of the second reference feature at a first time. The method further includes measuring a second distance between the centroid of the first reference feature and the centroid of the second reference feature at a second time, and comparing the first distance and the second distance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary component comprising a strain sensor and a plurality of reference nodes in accordance with one or more embodiments of the present disclosure;

FIG. 2 is an image of an exemplary strain sensor at a first time in accordance with one or more embodiments of the present disclosure;

FIG. 3 is an image of the strain sensor of FIG. 2 at a second time in accordance with one or more embodiments of the present disclosure;

FIG. 4 is an image of an exemplary node at a first time in accordance with one or more embodiments of the present disclosure;

FIG. 5 is an image of the node of FIG. 4 at a second time in accordance with one or more embodiments of the present disclosure;

FIG. 6 is a perspective view of a system for monitoring a component in accordance with one or more embodiments of the present disclosure;

FIG. 7 is a flow chart illustrating a method in accordance with one or more embodiments of the present disclosure; and FIG. 8 is a flow chart illustrating a method in accordance with one or more embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a component 10 is illustrated with a plurality of reference features 30 configured thereof. In particular, a strain sensor 40 and a plurality of nodes 35 are illustrated. Strain sensor 40 may include a plurality of surface features, as discussed herein, and each node 35 may be a surface feature 30. The component 10 (and more specifically the substrate of the overall component 10) can comprise a variety of types of components used in a variety of different applications, such as, for example, components utilized in high temperature applications (e.g., components comprising nickel or cobalt based superalloys). In some embodiments, the component 10 may comprise an industrial gas turbine or steam turbine component such as a combustion component or hot gas path component. In some embodiments, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In some embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications)

The component 10 has an exterior surface 11 on or beneath which surface features 30 may be configured. Surface features 30 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed surface features 30 using suitable mounting apparatus or techniques such as adhering, welding, brazing, etc.; or identifying pre-existing characteristics of the exterior surface 11 that can function as the components of a surface feature 30. Additionally, in further alternative embodiments, surface features 30 can be configured beneath exterior surface 11 using suitable embedding techniques during or after manufacturing of the component 10.

Referring now to FIGS. 1 through 3, a strain sensor 40 generally comprises at a plurality of reference features 30. A reference feature 30 of a strain sensor 40 may, for example, be an analysis feature 41, a locator feature 43, or a serial feature 45. Analysis features 41 may be disposed within an analysis region 42, locator features 43 may be disposed within a locator region 44, and serial features 45 may be disposed within a serial region 46 of the strain sensor 40. Generally, a locator feature 43 is utilized as a reference point for the measurement of distances 48 between the locator feature 43 and various analysis features 41. The measurements may be taken at a plurality of different times, as discussed herein. As should be appreciated to those skilled in the art, these measurements can help determine the amount of strain, strain rate, creep, fatigue, stress, etc. at that region of the component 10. The reference features 30 generally can be disposed at a variety of distances and in a variety of locations depending on the specific component 10 so long as the distances 48 can be measured. Moreover, the reference features 30 may comprise dots, lines, circles, boxes or any other geometrical or non-geometrical shape so long as they are consistently identifiable and may be used to measure distances 48.

The strain sensor 40 may comprise a variety of different configurations and cross-sections such as by incorporating a variety of differently shaped, sized, and positioned reference features 30. For example, as illustrated in FIGS. 2 and 3 and as discussed herein, the strain sensor 40 may comprise a variety of different reference features 30 comprising various shapes and sizes. Such embodiments may provide for a greater variety of distance measurements 48. The greater variety may further provide a more robust strain analysis on a particular portion of the component 10 by providing strain measurements across a greater variety of locations.

Furthermore, the values of various dimensions of the strain sensor 40 may depend on, for example, the component 10, the location of the strain sensor 40, the targeted precision of the measurement, application technique, and optical measurement technique. For example, in some embodiments, the strain sensor 40 may comprise a length and width ranging from less than 1 millimeter to greater than 300 millimeters. Moreover, the strain sensor 40 may comprise any thickness that is suitable for application and subsequent optical identification without significantly impacting the performance of the underlying component 10. Notably, this thickness may be a positive thickness away from the surface 11 (such as when additive techniques are utilized) or a negative thickness into the surface 11 (such as when subtractive techniques are utilized). For example, in some embodiments, the strain sensor 40 may comprise a thickness of less than from about 0.01 millimeters to greater than 1 millimeter. In some embodiments, the strain sensor 40 may have a substantially uniform thickness. Such embodiments may help facilitate more accurate measurements for subsequent strain calculations between the first and second reference points 41 and 42.

As illustrated, reference features 30 may in some embodiments be separated from each other by negative spaces 32. For example, the strain sensor 40 may comprise at least two applied reference features 30 separated by a negative space 32 (i.e., an area in which the strain sensor (and reference feature thereof) material is not applied). The negative space 32 may comprise, for example, an exposed portion of the exterior surface 11 of the component 10. Alternatively or additionally, the negative space 32 may comprise a subsequently applied contrasting (i.e. visually contrasting, contrasting in the ultraviolet or infrared spectrum, or contrasting in any other suitable range of wavelengths in the electromagnetic spectrum) material that is distinct from the material of the reference features 30 (or vice versa).

As discussed, in some embodiments, a strain sensor 40 may include a serial region 46 which may include a plurality of serial features 45. These features 45 may generally form any type of barcode, label, tag, serial number, pattern or other identifying system that facilitates the identification of that particular strain sensor 40. In some embodiments, the serial region 46 may additionally or alternatively comprise information about the component 10 or the overall assembly that the strain sensor 40 is configured on. The serial region 46 may thereby assist in the identification and tracking of particular strain sensors 40, components 10 or even overall assemblies to help correlate measurements for past, present and future operational tracking.

Additionally or alternatively, as discussed above and illustrated in FIGS. 1, 4 and 5, one or more nodes 35 may be configured on a component 10. A node 35 is generally a stand-alone surface feature which is configured on the component 10 and is not within the structure of a strain sensor 40 as discussed herein. Node 35 may be formed using materials and/or techniques as discussed herein with respect to the strain sensor 40 and surface features 30 thereof. Further, node 35 may have any suitable shape or size, as discussed herein with respect to the strain sensor 40 and surface features 30 thereof.

Surface features 30 may generally be configured in one or more of a variety of locations of various components 10. For example, as discussed above, surface features 30 may be configured on a blade, vane, nozzle, shroud, rotor, transition piece or casing. In such embodiments, the surface features 30 may be configured in one or more locations known to experience various forces during unit operation such as on or proximate airfoils, platforms, tips or any other suitable location. Moreover, the surface features 30 may be configured in one or more locations known to experience elevated temperatures. For example, the surface features 30 may be configured on a hot gas path or combustion turbine component 10.

As discussed herein and as shown in FIG. 1, multiple surface features 30 may be configured on a single component 10 and/or on multiple components 10. For example, a plurality of surface features 30 may be configured on a single component 10 (e.g., a turbine blade) at various locations such that the strain may be determined at a greater number of locations about the individual component 10. Alternatively or additionally, a plurality of like components 10 (e.g., a plurality of turbine blades) may each have a surface features 30 configured in a standard location so that the amount of strain experienced by each specific component 10 may be compared to other like components 10. In even some embodiments, multiple different components 10 of the same assembly (e.g., blades and vanes for the same turbine) may each have a surface features 30 configured thereon so that the amount of strain experienced at different locations within the overall assembly may be determined.

A coordinate system is additionally illustrated in FIGS. 1 through 5. The coordinate system includes an X-axis 50, a Y-axis 52, and a Z-axis 54, all of which are mutually orthogonal to each other.

Referring now to FIG. 6, a system 100 for monitoring a component 10 (and deformation thereof) is illustrated. System 100 may include, for example, one or more surface features 30 which are configurable on one or more components 10 as discussed above. System 100 further includes an image capture device 102 and a processor 104. The image capture device 102 generally obtains images of the surface feature(s) 30, and the processor 104 generally analyzes the images and performs other functions as discussed herein.

Imaging device 102 may include a lens assembly 110 and an image capture device 112. Lens assembly 110 may generally magnify images viewed by the lens assembly 110 for processing by the image capture device 112. Lens assembly 110 in some embodiments may, for example, be a suitable camera lens, telescope lens, etc., and may include one or more lens spaced apart to provide the required magnification. Image capture device 112 may generally be in communication with the lens assembly 110 for receiving and processing light from the lens assembly 110 to generate images. In exemplary embodiments, for example, image capture device 112 may be a camera sensor which receives and processes light from a camera lens to generate images, such as digital images, as is generally understood. Image capture device 112 (and device 102 generally) may further be in communication with processor 104, via for example a suitable wired or wireless connection, for storing and analyzing the images from the image capture device 112 and device 102 generally. Notably, in exemplary embodiments processor 104 operates imaging devices 102 to perform various disclosed steps.

As discussed, system 100 may further include a processor 104. In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 104 may also include various input/output channels for receiving inputs from and sending control signals to various other components with which the processor 104 is in communication, such as the imaging device 102, a robotic arm (discussed herein), etc. Processor 104 may generally perform various steps as discussed herein. Further, it should be understood that a processor 104 in accordance with the present disclosure may be a single master processor 104 in communication with the other various components of system 100, and/or may include a plurality of individual component processors, i.e. an imaging device processor, a data acquisition device processor, a robotic arm processor, etc. The various individual component processors may be in communication with each other and may further be in communication with a master processor, and these components may collectively be referred to as processor 104. Further, it should be noted that image capture device 112 may be a sub-component of processor 104, or may be a separate component from processor 104 which is in communication with processor 104.

As further illustrated in FIG. 6, system 100 may include a robotic arm 130. The robotic arm 130 may support and facilitate movement of other components system 100, such as the imaging device 102 and/or the processor 104. For example, the imaging device 102 may be mounted to the robotic arm 130. Processor 104 may be in communication with the robotic arm 130, such as with the various motors and/or drive components thereof, and may actuate the robotic arm 130 to move as required. Such movement may, in exemplary embodiments, position the imaging device 102 relative to the component 10 and surface feature(s) 30 thereon. In exemplary embodiments, the robotic arm 130 is a six-degree-of-freedom arm 130 which provides movement along and about axes 50, 52, 54.

In alternative embodiments, system 100 may include other suitable devices for supporting and facilitating movement of other components of system 100, such as the imaging device 102 and/or the processor 104. Such devices may, for example, be in communication with processor 104. For example, system 100 may include a boroscope, mobile robot (such as a snake robot), or other suitable device. Some such devices may facilitate performance of various steps as discussed herein when the component 10 is in situ in an associated assembly (i.e. a turbomachine, gas turbine, etc.). Alternatively, component 10 may be removed from the assembly when such steps are performed.

Referring now to FIGS. 7 and 8, the present disclosure is further directed to methods 200 for monitoring components 10. In exemplary embodiments, processor 104 may be utilized to perform various of the method steps 200 discussed herein. Accordingly, systems 100 and methods 200 may be configured for operation as discussed herein.

Referring, for example, to FIGS. 4, 5 and 7, a method 200 may in some embodiments include the step 210 of receiving an image of a reference feature 30 at a first time (see FIG. 4). The image may, for example be received by the processor 104 from the imaging device 102. The reference features 30 may, for example, be a node 35 as shown in FIGS. 4 and 5, or alternatively may be an element of a strain sensor 40, such as an analysis feature 41, a locator feature 43, or a serial feature 45.

The first time may generally be different from and before a second time (see FIG. 5) discussed herein, and the second time thus after the first time. In particular, the first time may be a time when the reference feature 30 is configured on the component 10 and before any operational use of the component 10, or when the reference feature 30 is configured on the component 10 and after a first period of operational use of the component 10. Operational use is generally use of the component 10 in an environment in which deformation may occur, such as in a turbomachine (i.e. a gas turbine, steam turbine, etc.) or other suitable assembly as discussed above. The second time may be a time when the reference feature 30 is configured on the component 10 and after a period of operational use of the component 10, which may for example be a first period relative to a component 10 that has not seen operational use or a second period relative to a component 10 that has seen a first period of operational use.

Method 200 may further include, for example, the step 220 of locating a centroid 222 of the reference feature 30, such as of the image of the reference feature 30 received in step 210. For example, the centroid 222 may be located in a two-dimensional coordinate system, such as an X-Y coordinate system utilizing X-axis 50 and Y-axis 52 as illustrated. The two dimensional coordinate system may for example, be applied to the image received in step 210, and the centroid 222 located for the reference feature 30.

A centroid in accordance with the present disclosure is a geometric center of a region, such as a two-dimensional region, and is thus the arithmetic mean or average position of all points in the shape. In exemplary embodiments, a centroid may be located through use of the imaging device 102 and processor 104. Processor 104, in analyzing an image of, for example, a reference feature, may calculate and thus locate the centroid of the reference feature.

Method 200 may further include, for example, the step 230 of measuring first values 232 of one or more characteristics of the reference feature 30 relative to the centroid 222 at the first time. For example, an image taken at a first time may be received in step 210, and a centroid 222 located for the reference feature 30. One or more characteristics of the reference features 30 may then be measured to obtain first values 232 therefor. The centroid 222 may be utilized as a reference point for the reference feature 30, from which one or more characteristics can be measured. For example, as discussed, a two-dimensional coordinate system may be established, and the centroid 222 located in the two-dimensional coordinate system. The centroid 222 may be utilized as a reference point in the two-dimensional coordinate system from which one or more characteristics can be measured. Accordingly, the first values 232 can be measured in the two-dimensional coordinate system relative to the centroid 222.

A characteristic of the reference feature 30 in accordance with the present disclosure may, for example, be any suitable two or three dimensional property of the reference feature 30. For example, a reference feature 30 may be an area, height (such as maximum height), width (such as maximum width), perimeter, first order moment of inertia, second order moment of inertia, etc. In exemplary embodiments, the characteristic may be measured in the image taken in step 210, and a first value 232 obtained by such measurement.

Method 200 may further include, for example, the step 240 of receiving an image of a reference feature 30 at a second time (see FIG. 5), as discussed herein. The image may, for example be received by the processor 104 from the imaging device 102.

Method 200 may further include, for example, the step 250 of measuring second values 252 of the one or more characteristics of the reference feature 30 relative to the centroid 222 at the second time. For example, an image taken at a second time may be received in step 240, and the centroid 222 located for the reference feature 30. The one or more characteristics of the reference features 30 may then be measured to obtain second values 232 therefor. The centroid 222 may again be utilized as a reference point for the reference feature 30, from which the one or more characteristics can be measured. For example, as discussed, the two-dimensional coordinate system may again be established, and the centroid 222 located in the two-dimensional coordinate system. The centroid 222 may be utilized as a reference point in the two-dimensional coordinate system from which the one or more characteristics can be measured. Accordingly, the second values 252 can be measured in the two-dimensional coordinate system relative to the centroid 222.

Method 200 may further include, for example, the step 260 of comparing the first value 232 and the second value 252. Such comparison may be utilized in a deformation analysis, such as to determine if local deformation (such as, for example, strain) has occurred in the component. In some embodiments, for example, a difference between the first value 232 and the second value 252 may be determined. This difference may be utilized to determine if deformation has occurred.

Notably, in some embodiments, steps 210, 220, 230, 240, 250 and/or 260 may be performed for a plurality of reference features 30 configured on a component 10. In exemplary embodiments, like characteristics and the first and second values 232, 252 thereof may be utilized for a deformation analysis. For example, method 200 may further include the step of averaging first values 232 of a characteristic for each of the plurality of reference features 30 to obtain an averaged first value 232', and the step of averaging second values 252 of a characteristic for each of the plurality of reference features 30 to obtain an averaged second value 252'. The comparing step 260 may then include comparing the averaged first value 232' and the averaged second value 252'.

Such methods facilitate deformation monitoring utilizing single reference features 30, and changes to the characteristics of such reference features 30 over time. The resulting deformation monitoring is thus more reliable by not requiring relying on measurements between multiple reference features 30 in order to facilitate further comparison and deformation analysis.

Referring now to FIGS. 2, 3 and 8, a method in accordance with the present disclosure may additionally or alternatively include various steps for monitoring deformation utilizing multiple reference features 30. For example, a method 200 may in some embodiments include the step 310 of receiving an image of a one or more first reference features 30' and one or more second reference features 30" at a first time (see FIG. 2). The image may, for example be received by the processor 104 from the imaging device 102. The reference features 30', 30" may, for example, be nodes 35, or alternatively may be elements of a strain sensor 40, such as analysis features 41, locator features 43, or serial features 45. In particular exemplary embodiments, a first reference feature 30' may be a serial feature 45 and thus disposed in serial region 46, and a second reference feature 30" may be an analysis feature 41 and thus disposed in analysis region 42.

Method 200 may further include, for example, the step 320 of locating a centroid 322' of each first reference feature 30' and a centroid 322" of each second reference feature 30", such as of the image of the reference features 30', 30" received in step 310. For example, the centroids 322', 322" may be located in a two-dimensional coordinate system, such as an X-Y coordinate system utilizing X-axis 50 and Y-axis 52 as illustrated. The two dimensional coordinate system may for example, be applied to the image received in step 310, and the centroids 322', 322" located for the reference feature 30.

Method 300 may further include, for example, the step 330 of measuring first distances 332 between one or more centroids 322' and one or more centroids 322" at the first time. A first distance 332 may be a distance between a centroid 322' and a centroid 322" at the first time. For example, an image taken at a first time may be received in step 310, and centroids 322', 322" located for the reference features 30', 30". First distances 332 may then be measured. For example, as discussed, a two-dimensional coordinate system may be established, and the centroids 322', 322" located in the two-dimensional coordinate system. Accordingly, the first distances 332 can be measured in the two-dimensional coordinate system.

Method 200 may further include the step 340 of receiving an image of the one or more first reference features 30' and the one or more second reference features 30" at a second time (see FIG. 3). The image may, for example be received by the processor 104 from the imaging device 102.

Method 200 may further include the step 350 of measuring second distances 352 between the one or more centroids 322' and the one or more centroids 322" at the second time. A second distance 352 may be a distance between a centroid 322' and a centroid 322" at the second time. For example, an image taken at a second time may be received in step 340, and centroids 322', 322" located for the reference features 30', 30". Second distances 352 may then be measured. For example, as discussed, a two-dimensional coordinate system may be established, and the centroids 322', 322" located in the two-dimensional coordinate system. Accordingly, the second distances 352 can be measured in the two-dimensional coordinate system.

Method 200 may further include, for example, the step 360 of comparing the first distance 332 and the second distance 352 between reference features 30' and 30". Such comparison(s) may be utilized in a deformation analysis, such as to determine if local deformation (such as, for example, strain) has occurred in the component. In some embodiments, for example, a difference between a first distance 332 and a second distance 352 may be determined. This difference may be utilized to determine if deformation has occurred.

Notably, in some embodiments, method 200 may further include the step 370 of assigning a first weighting factor 372 to each first reference feature 30' and a second weighting factor 374 to each second reference feature 30". Each weighting factor 372, 374 may be based on the area of the corresponding reference feature 30', 30". For example, a reference feature 30 having a particular area (or being within a particular range of areas) may be assigned a weighting factor of 1. A reference feature 30 having a relatively larger area (or being within a particular larger range of areas) may be assigned a weighting factor of greater than 1. A reference feature 30 having a relatively smaller area (or being within a particular smaller range of areas) may be assigned a weighting factor of less than 1. The weighting factors 372, 374 may, for example, be utilized during the comparing step 360, in particular when multiple first and second distances 332, 352 are compared for multiple sets of reference features 30', 30". The weighting factors 372, 374 may, for example, be utilized to increase or decrease the influence that a particular distance (or difference in distances) has on a deformation analysis.

Such methods facilitate deformation monitoring when utilizing multiple reference features 30, in particularly when strain sensors 40 are utilized which include serial features 45 which are different from strain sensor 40 to strain sensor 40. For example, utilization of methods 200 in accordance with the present disclosure reduces or eliminates reliance on locator features 43 by allowing serial features 45 and/or other suitable features to be utilized for the deformation analysis. The resulting deformation monitoring is thus more reliable by not requiring relying on measurements between specific reference features 30 in order to facilitate further comparison and deformation analysis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring a component, wherein the component is a turbine component having an exterior surface, the method comprising:
    locating a centroid of a first reference feature and a second reference feature configured on the exterior surface of the turbine component;
    measuring a first distance between the centroid of the first reference feature and the centroid of the second reference feature at a first time;
    measuring a second distance between the centroid of the first reference feature and the centroid of the second reference feature at a second time;
    performing an operational use of the turbine component after the first time and before the second time, wherein the turbine component experiences strain during the operational use; and
    comparing the first distance and the second distance.

2. The method of claim 1, further comprising the step of assigning a first weighting factor to the first reference feature and a second weighting factor to the second reference feature, the first weighting factor based on the area of the first reference feature, the second weighting factor based on the area of the second reference feature.

3. The method of claim 1, wherein the second reference feature is a plurality of second reference features.

4. The method of claim 1, wherein the first reference feature is a plurality of first reference features.

5. The method of claim 1, wherein the step of measuring the first distance is performed in a two-dimensional coordinate system; and wherein the step of measuring the second value is performed in the two-dimensional coordinate system.

6. The method of claim 1, further comprising receiving an image of the first reference feature and the second reference feature at the first time, and receiving an image of the first reference feature and the second reference feature at the second time.

7. The method of claim 1, wherein the first reference feature and the second reference feature are elements of a strain sensor configured on the exterior surface of the turbine component.

8. The method of claim 7, wherein the first reference feature is disposed within a serial region of the strain sensor.

9. A method for monitoring a turbine component, the turbine component having an exterior surface the method comprising:
    locating, with an image capture device, a centroid of a first reference feature and a second reference feature configured on the exterior surface of the turbine component;
    measuring, with a processor, a first distance between the centroid of the first reference feature and the centroid of the second reference feature at a first time;
    measuring, with the processor, a second distance between the centroid of the first reference feature and the centroid of the second reference feature at a second time; and
    comparing, with the processor, the first distance and the second distance.

10. The method of claim 9, further comprising receiving, with the processor; an image from the image capture device of the first reference feature and the second reference feature at the first time, and receiving, with the processor, an image from the image capture device of the first reference feature and the second reference feature at the second time.

11. The method of claim 9, further comprising the step of assigning a first weighting factor to the first reference feature and a second weighting factor to the second reference feature, the first weighting factor based on the area of the first reference feature, the second weighting factor based on the area of the second reference feature.

12. The method of claim 9, wherein the second reference feature is a plurality of second reference features.

13. The method of claim 9, wherein the first reference feature is a plurality of first reference features.

14. The method of claim 9, wherein the step of measuring the first distance is performed in a two-dimensional coordinate system, and wherein the step of measuring the second value is performed in the two-dimensional coordinate system.

15. The method of claim 9, wherein the first time occurs before operational use of the turbine component, and the second time occurs after operational use of the turbine component.

16. The method of claim 9, wherein the first reference feature and the second reference feature are configured on the exterior surface of the turbine component.

17. The method of claim 9, wherein the first reference feature and the second reference feature are elements of a strain sensor configured on the turbine component.

18. The method of claim 17, wherein the first reference feature is disposed within a serial region of the strain sensor.

* * * * *